A. J. DZIAK.
GEARING.
APPLICATION FILED JAN. 12, 1912.

1,047,509.

Patented Dec. 17, 1912.

WITNESSES
C. M. Walker
Edith L. Smith

Andrew J. Dziak
INVENTOR
by John A. Bommhardt
Attorney

UNITED STATES PATENT OFFICE.

ANDREW J. DZIAK, OF CLEVELAND, OHIO.

GEARING.

1,047,509.　　　　　Specification of Letters Patent.　　Patented Dec. 17, 1912.

Application filed January 12, 1912. Serial No. 670,822.

*To all whom it may concern:*

Be it known that I, ANDREW J. DZIAK, a subject of King Franz Joseph of Hungary, residing at Cleveland, in the county of Cuyahoga and State of Ohio, have invented certain new and useful Improvements in Gearing, of which the following is a specification.

This invention relates to means for transmitting power to a rotary shaft, from the reciprocating pistons of engines, particularly internal combustion engines, and includes particularly an operative connection between the piston rods and a spirally grooved shaft, a clutch or dog being employed for operatively connecting the piston rod to the shaft on one stroke and releasing the same on the back stroke.

Figure 1:
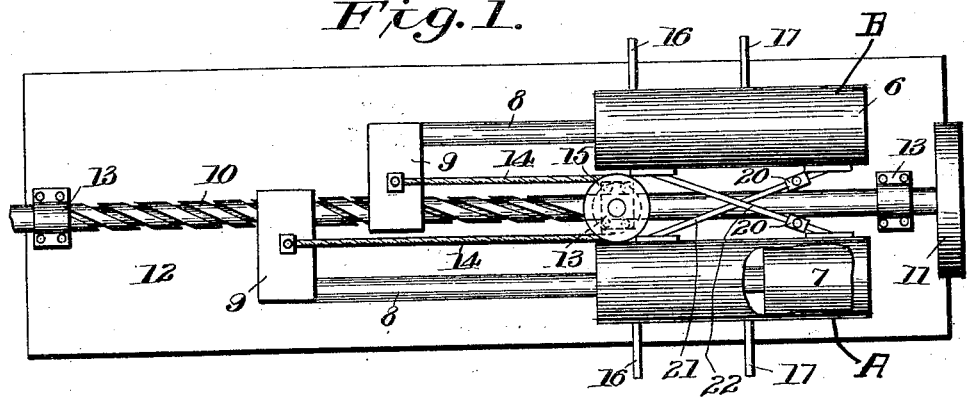
Figure 2:
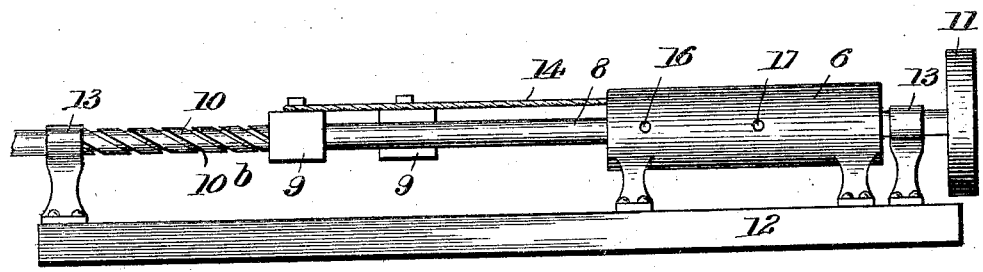
Figure 3:
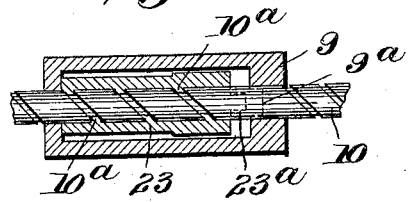

In the accompanying drawings,—Figure 1 is a plan view of the engine. Fig. 2 is a side elevation. Fig. 3 is a detail in longitudinal section of the shaft clutch.

Referring specifically to the drawings, A and B indicate a pair of internal combustion engines of any suitable type, and inasmuch as the details are immaterial, the illustration may be regarded as substantially diagrammatic.

The cylinders of the engines are indicated at 6, the pistons at 7 and the piston rods at 8, located with axes parallel to and on opposite sides of the shaft 10 which is to be driven.

11 is a fly wheel on the shaft, 12 is a base on which the parts are mounted and 13 are bearings for the shaft.

14 is a cable which passes around a pulley 15, mounted on one of the bearings 13, and the opposite ends of the cable are connected to the clutch blocks 9 which are either integral with or securely fastened to the outer ends of the pistons 8.

16 are gas inlets to the cylinders, and 17 the exhausts.

21 and 22 are cross connecting pipes between opposite ends of the opposite cylinders, and 20 are check valves in said pipes.

The blocks 9 have openings through which the shaft 10 passes, and are arranged to travel on different portions of the shaft, for which purpose one piston rod 8 is made long and the other short. Each block 9 has a recess through which the shaft 10 extends, and in this recess is a sleeve 23 which may turn on the shaft, and which has threads $10^a$ which fit in the threads or spiral grooves $10^b$ in the shaft 10. The sleeve 23 also has limited longitudinal movement in the recess in the block 9, and at one end has a projection $23^a$ adapted to engage in a notch $9^a$ in the block 9 on forward stroke of the piston to which said block is connected. This forms a clutch which when engaged will prevent rotation of the sleeve 23, thereby causing rotation of the shaft 10 in consequence of the spiral groove engagement. On the back stroke of the block 9 the clutch is opened and the sleeve 23 is free to rotate with the shaft 10, which at that time receives an impulse from the alternate operation of the other block 9, one block being advanced as the other is retracted. As one block and piston are advanced for the power stroke the other block and piston are pulled back for the compression stroke by means of the connecting cable 14 between the blocks.

In operation, assuming that an explosion is produced in the cylinder of the engine A, its piston 7 is pushed forward and the clutch of the block 9 connected thereto is engaged, producing rotation of the shaft 10. At the same time the piston of the engine B is pushed back, drawing in gas through the inlet 16, to fill the space in the front end of the cylinder. At the time of the explosion in the engine A the front end of its cylinder was full of gas, drawn in on the previous stroke, and as the piston 7 in the engine A is advanced it forces the gas through the pipe 21 and into the rear end of the cylinder of the engine B, where it is compressed by the ensuing back stroke of its piston 7, escape of the gas being prevented by the check valve 20 which opens into the cylinder. The gas thus compressed in the engine B is ignited and its piston 7 is thereby advanced for the power stroke, at the same time forcing the gas in the front end of the cylinder through the pipe 22 into the rear end of the cylinder A; and so the operation is repeated. The exploded gases are exhausted through the pipes 17 when they are uncovered by the movement forward of the pistons, said pipes, however, being covered on the backward or compression strokes of the pistons. The power is applied to the shaft 10 from the opposite units alternately, and such application of power is almost continuous, since each unit acts as a pump for the other.

What I claim is:

1. The combination of a shaft grooved spirally in one direction only, a pair of reciprocating rods located respectively on opposite sides of the shaft and movable parallel thereto, a block fixed to each rod and having a recess through which the shaft extends and a clutch member at one end of said recess, a sleeve mounted on the shaft in said recess and having a coöperating clutch member at one end thereof and also having a projection engaging in the groove in the shaft, the sleeve being rotatable with the shaft when the clutch members are disengaged, and being movable endwise in the recess, whereby the clutch is engaged and disengaged by the respective opposite movements of the block, and connecting means between the blocks to produce opposite reciprocation thereof.

2. The combination of a spirally grooved shaft, a pair of reciprocating rods movable parallel to the shaft, shaft driving members carried by the respective rods, said members being automatically engageable to drive the shaft when they move in one direction and automatically disengageable when they move in the opposite direction, and a connection between the rods to produce opposite reciprocation thereof.

3. The combination of a shaft spirally grooved in one direction only, a plurality of reciprocating rods located beside and movable parallel to the axis of said shaft, and driving devices carried by the respective rods, said devices being automatically engageable with the groove in the shaft when the rods are moved in one direction and automatically disengageable when they are moved in the opposite direction.

In testimony whereof, I do affix my signature in presence of two witnesses.

ANDREW J. DZIAK.

Witnesses:
JOHN A. BOMMHARDT,
J. B. DAVIS.

---

Copies of this patent may be obtained for five cents each, by addressing the "Commissioner of Patents, Washington, D. C."